(12) United States Patent
Farmer et al.

(10) Patent No.: US 10,829,073 B2
(45) Date of Patent: Nov. 10, 2020

(54) AIRBAG CHUTE WITH INTEGRAL SEAL

(71) Applicant: Faurecia Interior Systems, Inc., Auburn Hills, MI (US)

(72) Inventors: Scott Farmer, Liberty, SC (US); Peter Vitale, Windsor (CA)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 69 days.

(21) Appl. No.: 16/205,540

(22) Filed: Nov. 30, 2018

(65) Prior Publication Data

US 2020/0172038 A1    Jun. 4, 2020

(51) Int. Cl.
*B60R 21/205* (2011.01)
*B29C 44/34* (2006.01)
*B60R 13/02* (2006.01)
*B60R 21/2165* (2011.01)
*B29C 44/12* (2006.01)
*B29C 44/56* (2006.01)

(52) U.S. Cl.
CPC .......... *B60R 21/205* (2013.01); *B29C 44/351* (2013.01); *B60R 13/0256* (2013.01); *B60R 21/2165* (2013.01); *B29C 44/1228* (2013.01); *B29C 44/5681* (2013.01)

(58) Field of Classification Search
CPC .............. B60R 21/205; B60R 21/2165; B60R 13/0256; B29C 44/351; B29C 44/1228; B29C 44/5681
See application file for complete search history.

(56) References Cited

U.S. PATENT DOCUMENTS

| | | | |
|---|---|---|---|
| 6,237,935 B1 * | 5/2001 | Gray | B29C 44/1233 280/728.3 |
| 6,250,669 B1 * | 6/2001 | Ohmiya | B60R 21/205 280/728.2 |
| 6,375,878 B1 | 4/2002 | Gray et al. | |
| 7,434,828 B2 | 10/2008 | Okamoto et al. | |
| 7,992,890 B2 | 8/2011 | Nogaret et al. | |
| 8,469,393 B1 | 6/2013 | Siewert et al. | |
| 8,870,219 B1 * | 10/2014 | Roy | B60R 21/205 280/728.3 |
| 9,039,036 B1 * | 5/2015 | Roy | B29C 44/1257 280/728.3 |
| 9,409,541 B2 * | 8/2016 | Burry | B29C 44/351 |
| 10,040,227 B2 * | 8/2018 | Lard | B60R 21/217 |
| 2004/0145164 A1 * | 7/2004 | North | B60R 21/2165 280/732 |
| 2005/0087963 A1 | 4/2005 | Dailey et al. | |
| 2010/0230938 A1 | 9/2010 | Mazzocchi et al. | |
| 2010/0230939 A1 | 9/2010 | Mazzocchi et al. | |
| 2011/0062685 A1 | 3/2011 | Kim et al. | |

\* cited by examiner

*Primary Examiner* — Drew J Brown
(74) *Attorney, Agent, or Firm* — Reising Ethington P.C.

(57) ABSTRACT

A vehicle interior panel includes a seal between a substrate and an airbag chute and around an opening in the substrate through which the airbag chute is installed. The seal prevents a foam layer from extending into the opening when the foam layer is being molded. The seal is attached to the airbag chute prior to assembly with the substrate and is made from a material that is more flexible than the airbag chute material. The seal can be attached to the airbag chute in a two-shot molding process and spaced from the perimeter of the airbag chute along its back side. During molding of the foam layer, foam expansion pressure acts to improve the function of the seal as a foam barrier.

19 Claims, 3 Drawing Sheets

AIRBAG CHUTE WITH INTEGRAL SEAL

TECHNICAL FIELD

The present disclosure is related generally to vehicle interior panels and, more particularly, to such panels in which airbag modules are installed.

BACKGROUND

Modern vehicles are often equipped with one or more airbags as crash safety devices. Airbags may be hidden from view behind or beneath an interior vehicle panel until deployment during a collision. In some cases, the airbag inflates into the passenger cabin through an opening formed through the concealing panel. It is sometimes desirable to conceal not only the airbag module, but also to conceal the very presence of the airbag module so that the aesthetics of the vehicle interior can be designed independently from the functionality of the safety restraints. Manufacturers have developed interior panels with hidden airbag doors and/or tear lines along which the panel breaks open during airbag deployment to meet that objective. Some of these interior panels are made with a foam-in-place cushioning layer between a visible decorative layer and an underlying structural layer. When the structural layer has a pre-formed airbag deployment opening formed through it, that opening must be sealed during the foam-forming operation to prevent the expanding foam from leaking out.

U.S. Pat. No. 7,434,828 to Okamoto et al. discloses an arrangement in which an airbag door frame is said to form a seal as a barrier to foam expansion into an airbag opening that is formed through a base material. The seal is molded as a single piece from the same material as the airbag door and frame and, by its nature, can only be located at the perimeter of the airbag door frame. This type of seal is known in the industry as a "flash" seal because it is a very thin lateral extension formed at the parting line of the injection molding tool that resembles mold flash—a typically undesirable molding phenomenon than can result from a worn tool, excessive molding pressure, or an undersized molding press. In practice, vehicle manufacturers have experienced problems with this type of seal because, like mold flash, it is inconsistent, fragile, flimsy, and lacks dimensional stability.

SUMMARY

In accordance with one or more embodiments, a method of making a vehicle interior panel includes the steps of assembling an airbag chute to a vehicle interior panel substrate to form a substrate assembly and then molding a foam layer onto the substrate assembly to form the vehicle interior panel. The airbag chute is formed from a first material, and a perimeter of the airbag chute surrounds an opening in the substrate in the substrate assembly. A seal is affixed to the airbag chute before the step of assembling. The seal is configured to circumscribe the substrate opening to prevent the foam layer from extending into the opening during the step of molding. The seal is formed from a second material having greater flexibility than the first material.

In some embodiments, the seal is overmolded onto the airbag chute before the step of assembling.

In some embodiments, the airbag chute and the seal are molded in a two-shot molding process.

In some embodiments, the seal includes a protrusion that circumscribes the opening in the substrate assembly. The protrusion extends away from a back side of the airbag chute to a distal end that is located within and spaced from the perimeter of the airbag chute.

In some embodiments, the step of assembling includes bending a protrusion of the seal toward a back side of the airbag so that the seal is biased against the substrate in the substrate assembly.

In some embodiments, a protrusion of the seal extends away from a back side of the airbag chute and toward the perimeter of the airbag chute to define a channel between the protrusion and the back side of the airbag chute.

In some embodiments, the seal includes first and second protrusions. The first protrusion circumscribes the opening in the substrate assembly and protrusion extends away from a back side of the airbag chute to a distal end that is located within and spaced from the perimeter of the airbag chute. The second protrusion circumscribes the first protrusion and extends away from the back side of the airbag chute to a distal end that is located between the perimeter of the airbag chute and the distal end of the first protrusion.

In some embodiments, the airbag chute includes a stand-off formed from the first material that contacts the substrate during the step of assembling to limit the amount of compression of the seal and to define a distance between a back side of the airbag chute and the substrate.

In some embodiments, a stand-off is located between the seal and the perimeter of the airbag chute.

In some embodiments, a stand-off is located along the perimeter of the airbag chute.

In some embodiments, a stand-off includes a plurality of posts spaced apart along the back side of the airbag chute surrounding the substrate opening.

In some embodiments, a stand-off is located along a back side of the airbag chute between first and second protrusions of the seal.

In accordance with one or more embodiments, a vehicle interior panel includes a substrate, an airbag chute, a foam layer, and a seal. The substrate has an airbag deployment opening formed therein. The airbag chute is attached to the substrate, has a perimeter surrounding the airbag deployment opening, and is formed from a first material. The foam layer overlies the substrate and the airbag chute. The seal is interposed between a back side of the airbag chute and the substrate. The seal is formed from a second material having greater flexibility than the first material. The seal circumscribes the airbag deployment opening and defines a first interface with the airbag chute and a second interface with the substrate. The first interface includes a chemical bond between the first and second materials without an interposed adhesive material. The foam layer has a boundary defined in part by the first and second interfaces such that the foam layer surrounds and extends over the airbag deployment opening but not into or through the airbag deployment opening.

In some embodiments, the seal extends away from the back side of the airbag chute to a distal end that is located within and spaced from the perimeter of the airbag chute.

In some embodiments, a channel is defined between the seal and the back side of the airbag chute with the foam layer extending into the channel.

It is contemplated that any number of the individual features of the above-described embodiments and of any other embodiments depicted in the drawings or description below can be combined in any combination to define an invention, except where features are incompatible.

BRIEF DESCRIPTION OF THE DRAWINGS

Illustrative embodiments will hereinafter be described in conjunction with the following figures, wherein like numerals denote like elements, and wherein.

DESCRIPTION OF ILLUSTRATIVE EMBODIMENTS

Described below is a vehicle interior panel that includes a seal configured to prevent a foam layer from extending into an airbag deployment opening during a foam molding operation. The seal may be attached to an airbag chute prior to assembly with the substrate and made from a material that is more flexible than the airbag chute material. The seal can be attached to the airbag chute in a two-shot molding process or other means without the need for an additional adhesive material. The seal can also be configured such that foam expansion pressure acts to improve the function of the seal as a foam barrier during the foam molding operation.

Figure 1:
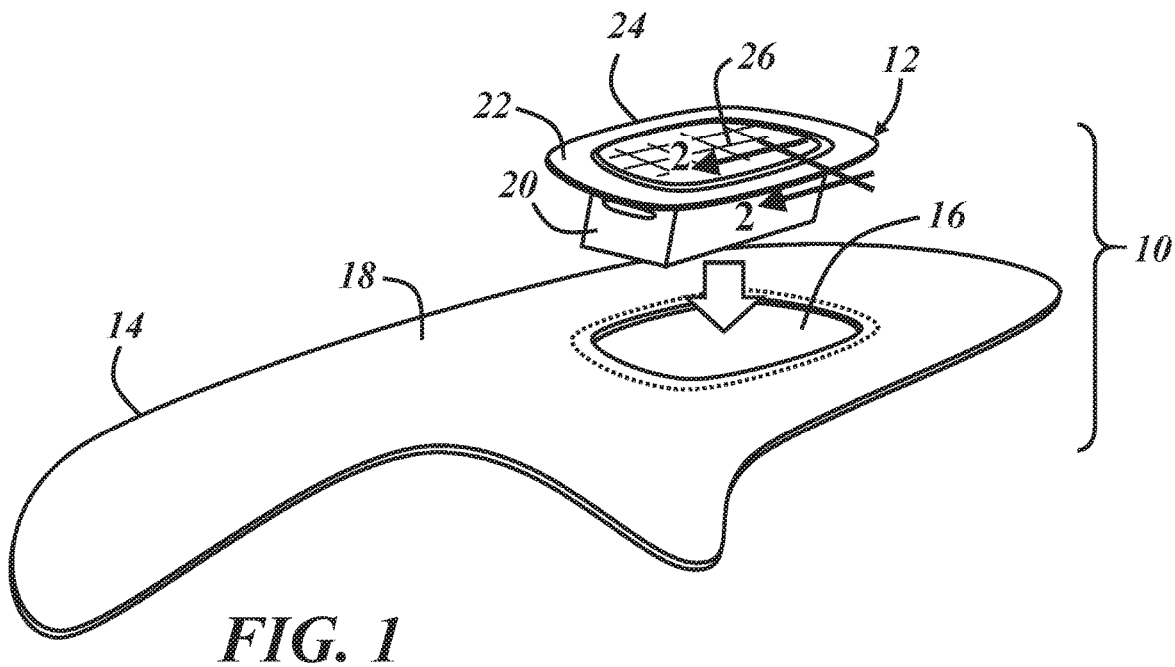
FIG. 1 is a perspective view of an airbag chute and a vehicle interior panel substrate prior to assembly.

FIG. 1 is a perspective view of a substrate assembly 10 prior to assembly, including an airbag chute 12 and a vehicle interior panel substrate 14. The substrate 14 is the underlying structure of the finished vehicle interior panel as installed in a vehicle and thus supports overlying decorative layers while also providing attachment locations and support for other interior components such as displays, controls, doors, handles, etc. One such component is an airbag module, which may include the airbag chute 12 and an airbag canister or other component containing an inflatable airbag. The airbag canister is not illustrated in the figures but may be attached along the bottom of the airbag chute, such as via slots along sides of the airbag chute. The illustrated substrate 14 is that of a vehicle instrument panel to be equipped with a passenger side airbag. The substrate 14 may be formed from glass fiber-reinforced polypropylene or any other suitably rigid material or composite. These teachings are applicable to other vehicle interior panels made from other materials as well, such as door panels, seat panels, steering wheel panels, bolster panels, etc.

The illustrated airbag chute 12 is of the drop-in variety, being configured for assembly with the substrate 14 via insertion of a portion of the airbag chute through an airbag deployment opening 16 formed through the thickness of the substrate. In particular, the substrate assembly 10 is formed by moving the airbag chute 12 and an outer side 18 of the substrate 14 toward each other with the airbag chute aligned with the opening 16 until a chute portion 20 of the airbag chute extends through the opening and a flange portion 22 of the airbag chute rests over the substrate with its perimeter 24 surrounding the opening 16. The flange portion 22 frames an airbag door 26, which is configured to pivot open during airbag deployment under the force of the inflating airbag.

In the illustrated example, the airbag door 26 is made from the same material as one piece with the chute portion 20 and the flange portion 22 and is depicted with stiffening ribs along its outer side. A living hinge is formed along a rear edge of the door 26, and a gap is defined between the door and the flange portion 22 along the other three sides of the door. In some embodiments, the airbag door 26 is not fully formed until airbag deployment. For example, the flange portion 22 may have a solid outer surface closing off the top end of the chute portion 20 with a line of weakening (e.g., a notch) formed along its underside at the desired airbag door location. The inflating airbag breaks through the airbag chute 12 along the line of weakening to form the airbag door 26. Alternatively, material bridges can be spaced along the illustrated gap and configured to break under the force of the inflating airbag—i.e., the gap is in the form of a series of slots surrounding the airbag door 26. The airbag chute 12 can include airbag doors 26 in any quantity and/or shape or may be formed with no airbag door at all.

Figure 2:
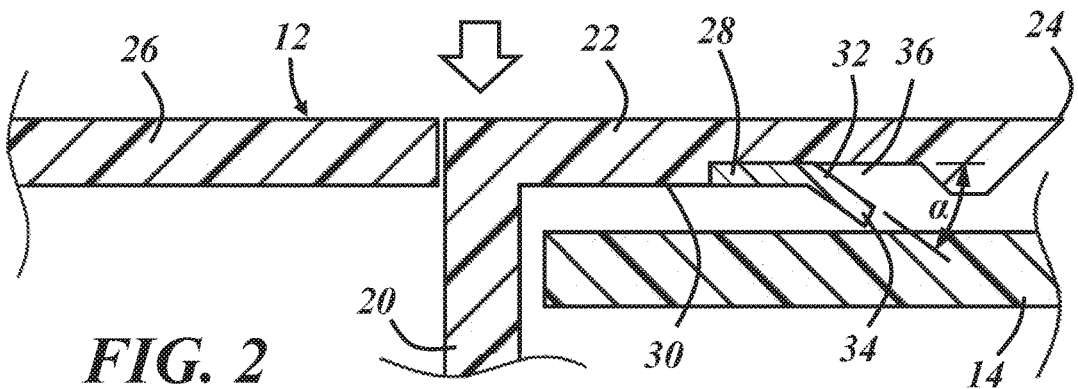
FIG. 2 is a cross-sectional view of a portion of the airbag chute and substrate during assembly.

FIG. 2 is a cross-sectional view of a portion of the airbag chute 12 and substrate 14 during assembly and illustrates a seal 28 interposed between the airbag chute 12 and the substrate 14. The seal 28 is made from a different material than the airbag chute 12 and is affixed to the airbag chute 12 before assembly of the chute with the substrate 14. The seal is configured to circumscribe the substrate opening 16 to prevent a subsequently formed foam layer from extending into the opening during a foam molding step. The intended seal location along the substrate 14 is illustrated as a broken line in FIG. 1.

In this example, the seal 28 is attached to a back side 30 of the airbag chute 12 along the flange portion 22. In the illustrated embodiment, the seal 28 includes a protrusion 32 extending from the back side 30 of the flange portion 22 to a distal end 34. The protrusion 32 also extends outward toward the perimeter 24 of the airbag chute 12 and forms an angle α with the back side 30 of the flange portion. A channel 36 is thereby defined between the protrusion and the back side 30 of the flange portion 22. The angle α is about 25 degrees in FIG. 2 but can range anywhere between 0 and 90 degrees. An angle α between 15 and 75 degrees or between 20 and 50 degrees is also suitable.

Figure 3:
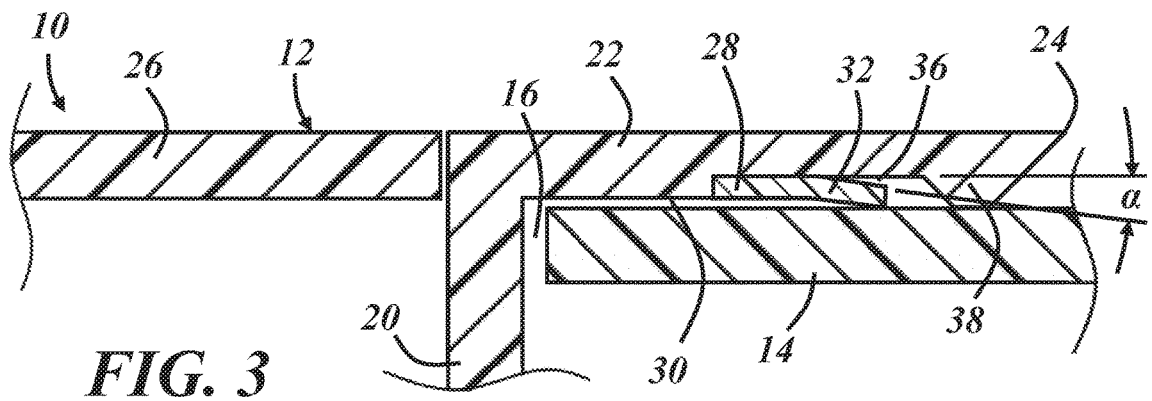
FIG. 3 is a cross-sectional view of a portion of a substrate assembly formed from the airbag chute and substrate of FIG. 2.

FIG. 3 is a cross-sectional view of the substrate assembly 10 after the airbag chute 12 is attached to the substrate 14. During assembly, the protrusion 32 bends toward the back side 30 of the flange portion 22, thereby reducing the angle α and the size of the channel 36. The flange portion 22 and the substrate are moved toward each other until a stand-off 38 contacts the substrate 14. The airbag chute 12 is then attached to the substrate 14 in this position in any suitable manner (e.g., snap features, threaded fasteners, heat or ultrasonic staking, etc.). The seal 28 is thus biased in a direction toward the substrate 14 via residual stress in the seal material.

The stand-off 38 limits the amount of compression of the seal and sets the distance between the back side 30 of the flange portion 22 and the outer side 18 of the substrate 14 to help ensure that the seal 28 is in proper contact with the substrate 14 all the way around the substrate opening 16. The stand-off 38 extends from the back side 30 of the flange portion 22 farther than any other feature of the flange portion, but not as far as the seal 28 in the unassembled state. This ensures that the seal 28 contacts the substrate 14 before the chute 12 is fully seated. In this example, the stand-off 38 is in the form of a rib or ridge that extends along the perimeter 24 of the airbag chute 12. This ridge may be continuous or discontinuous along the chute perimeter 24.

Figure 4:
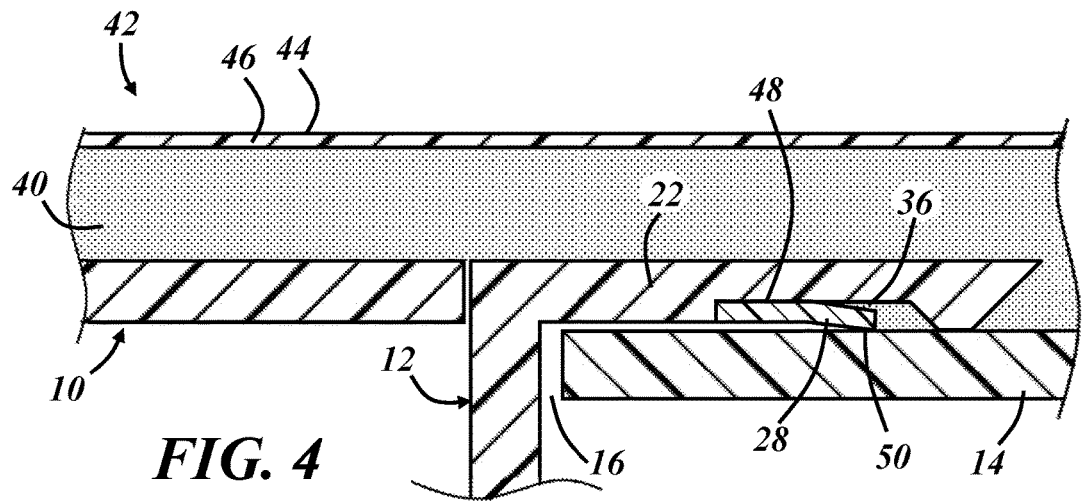
FIG. 4 is a cross-sectional view of a portion of a vehicle interior panel formed from the substrate assembly of FIG. 3.

FIG. 4 is a cross-sectional view of the substrate assembly 10 after being subjected to a foam molding process to form a foam layer 40 over the substrate 14 and thereby form the vehicle interior panel 42. The details of the foam molding process are not illustrated here but generally include placing the substrate assembly 10 in a molding tool with the outer surface of the substrate 14 defining a portion of a mold cavity. A surface of the molding tool opposes the substrate 14 across the mold cavity and defines the contour of an outer surface 44 of a skin layer 46. A liquid foam pre-cursor is introduced to the cavity and subsequently expands to fill the cavity. A two-component polyurethane is a suitable foam system, but other foam chemistries may be used. The skin layer 46 can be a separately provided layer of material (e.g., slush molded PVC or TPO sheet stock) placed in the molding tool with the decorative outer surface 44 facing the foam mold and the liquid pre-cursor introduced between the substrate 14 and the skin layer 46. Or the skin layer 46 can be formed by the foam material itself when the expanding foam presses against the relatively cool mold surface where it forms a skin of higher density than the bulk foam.

The seal 28 is configured to function as a barrier to prevent the foam layer 40 from extending into the substrate opening 16 during foam expansion. As illustrated in FIG. 4, the finished foam layer 40 thus has a boundary defined in part by the seal 28 such that the foam layer surrounds and extends over the substrate opening 16 and over the air bag chute 12, but not into or through the opening 16 in the substrate 14. Expanding foam that makes its way to the channel 36 between the protrusion 32 and the back side of the flange portion 22 operates to press the protrusion against the substrate 14 with even more force.

The seal 28 thus partly defines a first interface 48 with the airbag chute 12 and a second interface 50 with the substrate 14 wherever the seal is in interfacial contact with the respective components of the substrate assembly 10 and the vehicle interior panel 42. The interface 50 between the seal 28 and the substrate is characterized by simple opposing forces—i.e., the seal 28 and the substrate 14 are pressed together, with the biasing force of the seal holding the components together at the interface 50, even in the absence of material of the foam layer 40. The interface 48 between the seal 28 and the airbag chute includes chemical bonding between the materials of the respective components. Further, the chemical bonding is directly between the respective materials of the seal 28 and the airbag chute 12 and is characterized by the absence of an intervening adhesive layer. This chemical bonding allows the seal 28 to be affixed to the airbag chute 12 before assembly to the substrate 14 while also eliminating any need for an adhesive layer, as would be the case with a stick-on gasket, for example.

The seal 28 is formed from a material having greater flexibility than the material from which the airbag chute 12 is formed. This means the seal material has a lower flexural modulus than the chute material when subjected to the same standardized flexural modulus testing for polymeric materials, such as ISO or ASTM standards. The seal material may also be characterized by a lower durometer than the chute material, when both materials are elastomeric and durometer testing is appropriate. In some embodiments, the two different materials are both elastomers such as thermoplastic elastomers (TPEs), but with different flexural properties and/or hardness. Polyolefin-based TPEs may be suitable for both the chute 12 and the seal 28. The two different materials are preferably in the same polymeric material family, such as polyolefins, polyesters, polyurethanes, or styrenics. Materials selected from the same polymeric material family can form a stronger chemical bond with each other in the absence of an adhesive—i.e., their chemical compatibility allows polymer molecules from both materials to intermingle at the interface 48 to form the chemical bond without adhesive.

Figure 5:
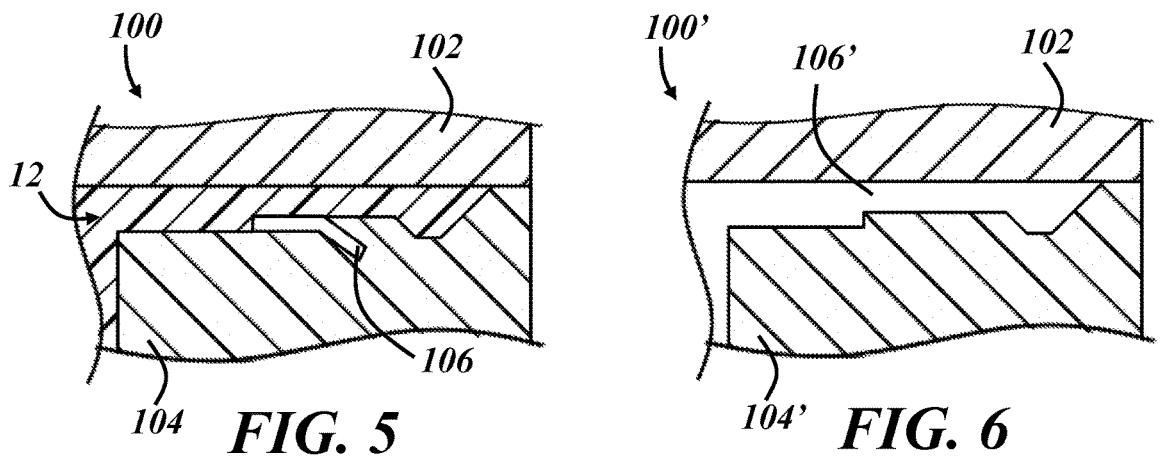
FIG. 5 is a cross-sectional view of a portion of an overmolding tool for attaching a seal to the airbag chute.

In one embodiment, the seal 28 is overmolded onto the airbag chute 12 prior to assembly of the substrate assembly 10. A simplified version of an overmolding process is depicted in FIG. 5. The airbag chute 12 is formed from a first material via injection molding or another suitable process and is then placed in a molding tool 100 between first and second portions 102, 104 of the molding tool. The cavity of the molding tool 100 is shaped to accommodate the pre-molded airbag chute 12 with an additional cavity volume 106 in the shape of the desired seal. When the tool 100 is in the closed condition with the airbag chute in the cavity as shown in FIG. 5, the airbag chute 12 partly defines a portion of an overmolding cavity at the additional cavity volume 106. The second more flexible material is injected into the overmolding cavity 106 along the back side of the flange portion of the airbag chute 12 to form the seal 28.

As noted above, the depiction in FIG. 5 is simplified. For example, skilled artisans will recognize a potential die-lock condition in FIG. 5 where the second portion 104 of the molding tool 100 extends between the stand-off 38 of the airbag chute 12 and the overmolding cavity 106. Moving mold components such as slides or lifters may be required with the illustrative seal shape and are not illustrated in FIG. 5. It is noted, however, that one of the advantages of forming the seal 28 from a different material than that of the airbag chute—in particular a more flexible material—is that certain undercut features similar to that of FIG. 5 can be molded without moving mold components if the seal material is sufficiently flexible to elastically bend during the mold opening step after the overmolding process to allow the overmolded airbag chute seal to be extracted from the molding tool with straight movement of the mold portions 102, 104 away from each other.

Figure 6:
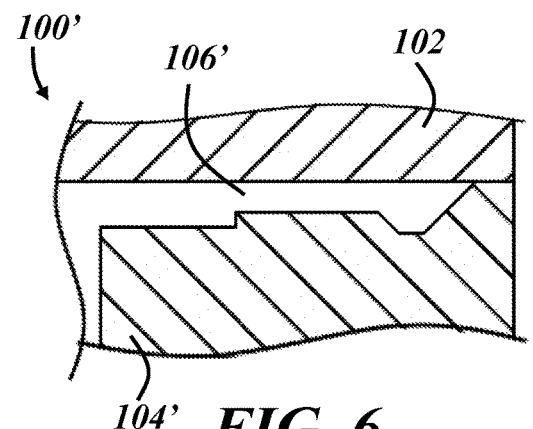
FIG. 6 is a cross-sectional view of a portion of a molding tool for molding the airbag chute.

In one embodiment, the airbag chute 12 and the seal 28 are formed in a two-shot molding process. Two-shot molding is a type of overmolding in which the pre-molded component—in this case, the airbag chute 12—is not completely removed from the molding tool in which it was formed when subjected to the overmolding step. With reference to FIG. 6, for example, the first portion 102 of the overmolding tool 100 of FIG. 5 may also be the first portion 102 of the injection molding tool 100' that formed the airbag chute 12 with a different second tool portion 104'. The injection molding tool 100' for the airbag chute 12 and the overmolding tool 100 thus share the first mold portion 102 but use different second mold portions 104', 104.

In a specific example, the first mold portion 102 is supported by a rotary table configured to move the first mold portion between two different locations. At the first location, the first mold portion 102 is aligned with the second mold portion 104' of the airbag chute molding tool 100', the tool is closed to form the airbag chute cavity 106' as in FIG. 6, and the first material is injected into the cavity to form the airbag chute 12. Then, the second mold portion 104' is moved away from the first mold portion 102, and the table rotates to move the first mold portion to the second location. At the second location, the first mold portion 102 is aligned with the second mold portion 104 of the overmolding tool 100, the tool is closed to form the overmolding cavity 106 as in FIG. 5, and the second material is injected into the cavity to form the seal 28. The airbag chute 12 and overmolded seal 28 are then removed from the tool 100 at either the first or second location so the cycle can begin again.

Figure 7:
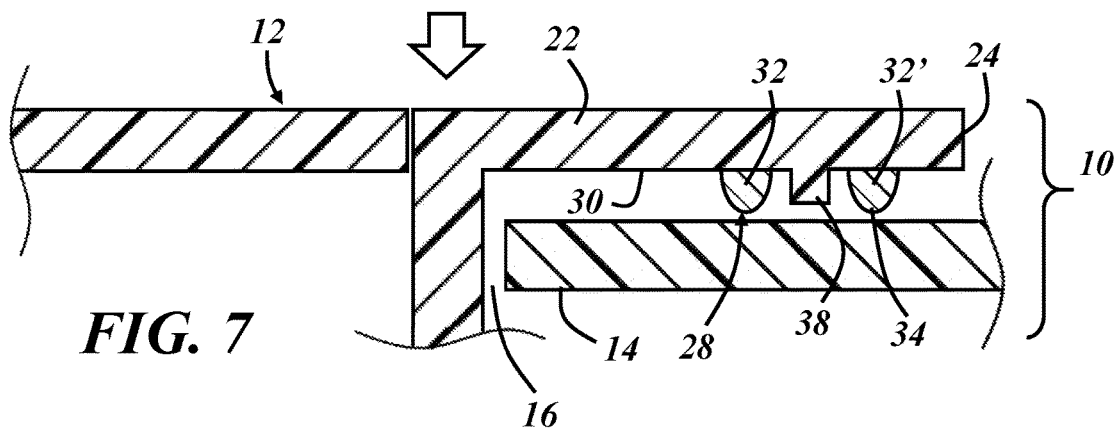
FIG. 7 is a cross-sectional view of a portion of an airbag chute and substrate during assembly with a different seal.

FIG. 7 is a cross-sectional view of another example of the substrate assembly 10 during assembly. In this example, the seal 28 includes a first protrusion 32 and a second protrusion 32'. Both protrusions 32, 32' surround the opening 16 in the substrate 14, and both protrusions are located within the perimeter 24 of the flange portion 22 of the airbag chute 12. The second protrusion 32' surrounds the first protrusion 32 such that the first protrusion is entirely within the perimeter of the second protrusion. Both protrusions 32, 32' are continuous along the flange portion 22 and around the substrate opening 16. The stand-off 38 in this example is located between the protrusions 32, 32', each of which extends away from the back side 30 of the flange portion 22 to a respective distal end 34 which is spaced farther from the back side of the flange portion than the stand-off.

Figure 8:
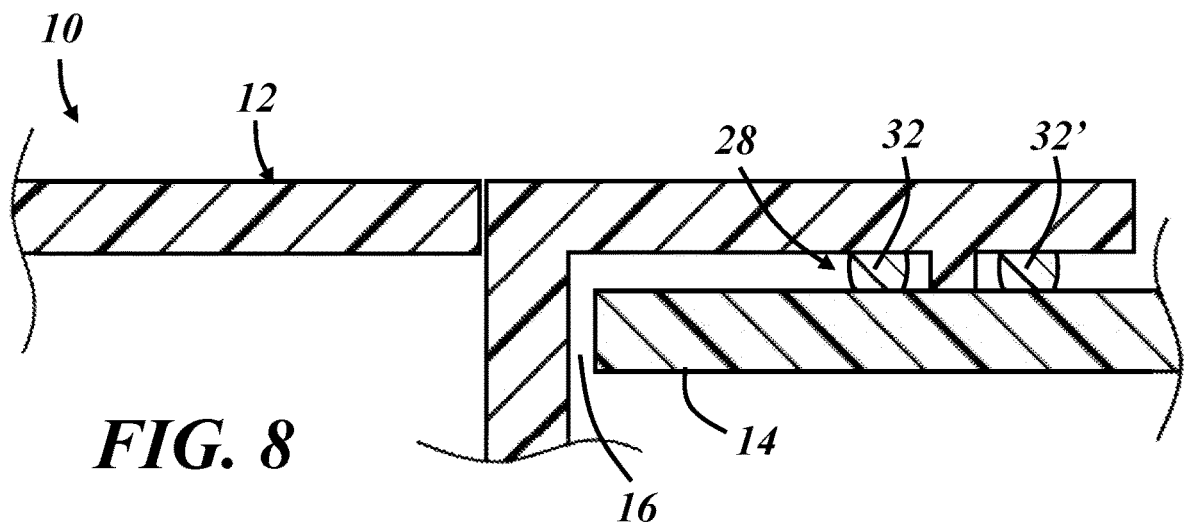
FIG. 8 is a cross-sectional view of a portion of the substrate assembly formed from the airbag chute and substrate of FIG. 7.

FIG. 8 is a cross-sectional view of the substrate assembly 10 of FIG. 7 after the airbag chute 12 is attached to the substrate 14. During assembly, the protrusions 32, 32' compress to form the foam barrier and are thus biased against the substrate 14 via residual compressive stress in the seal material. The seal 28 thus includes a dual foam barrier that further prevents the subsequently added foam layer from extending into the deployment opening 16 in the substrate 14. The total effectiveness of the seal 28 with two nested protrusions is significantly better than the effectiveness of only one. For example, if each protrusion 32, 32' is only 95% effective as a barrier, their combined effectiveness is essentially 100%. When formed as an overmolding, the additional cost of the second protrusion is negligible since it is formed at the same time as the first protrusion.

Figure 9:
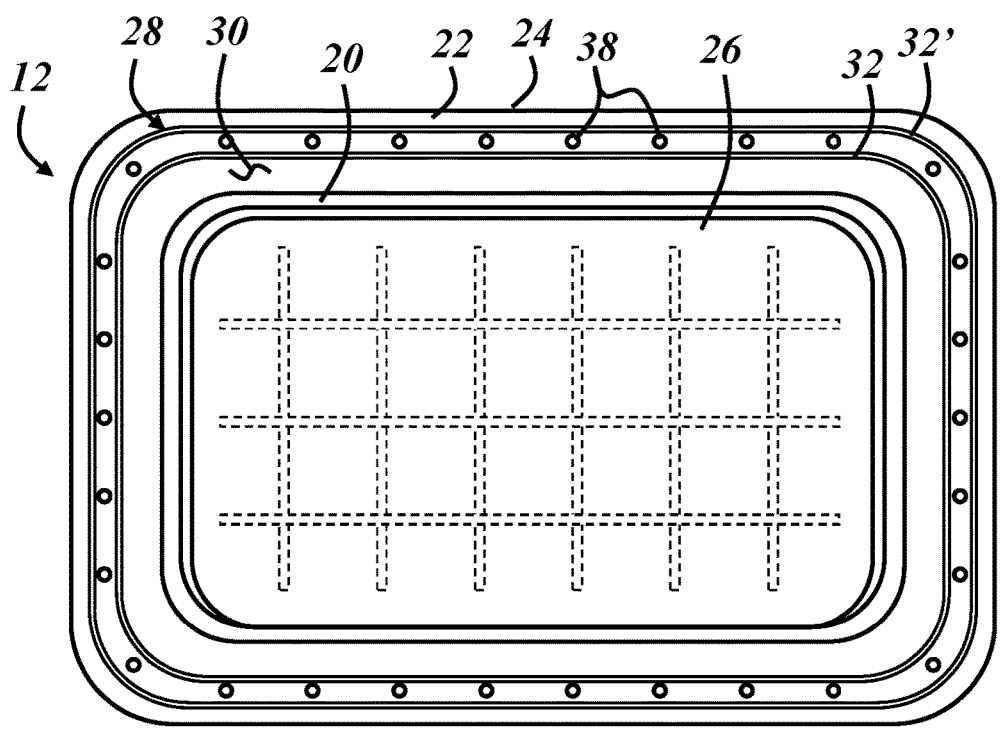
FIG. 9 is a bottom view of the airbag chute of FIGS. 7 and 8.

FIG. 9 is a bottom view of the back side 30 of the airbag chute 12 of FIG. 7 after the seal 28 is affixed and before being aligned with the substrate for assembly. Some corresponding elements from the previous figures are labeled in FIG. 9 even if not mentioned below. FIG. 9 illustrates the stand-off 38 as a plurality of individual posts extending away from the back side 30 of the flange portion 22 of the airbag chute 12. The stand-off posts are located between the protrusions 32, 32' of the seal 28 and are distributed to surround the entire chute portion 20 of the airbag chute. This and other discontinuous forms of the stand-off 38 can help prevent dimensional instability (e.g. warping) sometimes associated with continuous ribs or ridges while providing the same function as a positive stop during assembly to the substrate.

One advantage of forming the seal 28 from a different material than the airbag chute 12 is the broader selection of possible materials for the airbag chute 12. For example, an airbag chute with an integrally molded seal such as the Okamoto structure mentioned above greatly limits the number of materials from which the airbag chute can be made. In particular, the material must be suitably flexible and shape-conforming to form a good seal with the substrate. But these material properties may be different from those desired in the airbag chute. For instance, a very low durometer elastomeric material may be desirable to form a robust seal, but the same material may not have sufficient integrity to function as the airbag chute. Contrarily, a material that is sufficiently rigid to function as the airbag chute may not be flexible enough to form a good seal with the substrate. The presently disclosed configuration eliminates the need to reach a compromise between airbag chute and seal material properties.

An advantage of attaching the seal 28 to the airbag chute 12 prior to assembly with the substrate 14 is improved seal positioning compared to processes in which a gasket is first positioned on the substrate around the airbag deployment opening. In such a process, extra care must be taken to ensure the gasket will align with the desired part of the flange portion of the airbag chute.

The elimination of adhesives is another advantage of the above-described process and assembly. Adhesives are expensive and difficult by their sticky nature to control in a manufacturing environment, where idle time on an assembly line leads to process variability as adhesive in an adhesive applicator may be partly cured when the assembly line starts again.

It is contemplated that the chemical bonding that secures the seal 28 to the substrate 14 at the interface 48 of the two components without adhesive may be achieved in ways other than overmolding. Bonding energy may be applied in other ways, such as via ultrasonic energy or heat sealing, to name a few examples.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of making a vehicle interior panel, the method comprising the steps of:
   (a) assembling an airbag chute to a vehicle interior panel substrate to form a substrate assembly with a perimeter of the airbag chute surrounding an opening in the substrate, the airbag chute being formed from a first material; and
   (b) molding a foam layer onto the substrate assembly to form the vehicle interior panel,
   wherein a seal is affixed to the airbag chute before step (a) and configured to circumscribe the substrate opening to prevent the foam layer from extending into the opening during step (b), the seal being formed from a second material having greater flexibility than the first material,
   wherein the seal comprises a first protrusion that circumscribes the opening in the substrate assembly, the first protrusion extending away from a back side of the airbag chute to a distal end that is located within and spaced from said perimeter, and
   wherein the seal comprises a second protrusion that circumscribes the first protrusion, the second protrusion extending away from the back side of the airbag chute to a distal end that is located between said perimeter and the distal end of the first protrusion.

2. The method of claim 1, wherein the seal is overmolded onto the airbag chute before step (a).

3. The method of claim 1, wherein the airbag chute and the seal are molded in a two-shot molding process.

4. The method of claim 1, wherein step (a) includes biasing the seal against the substrate.

5. The method of claim 1, wherein the airbag chute includes a stand-off formed from the first material that contacts the substrate during step (a) to limit the amount of compression of the seal and to define a distance between a back side of the airbag chute and the substrate in the substrate assembly.

6. The method of claim 5, wherein the stand-off is located between the seal and said perimeter.

7. The method of claim 5, wherein the stand-off is located along said perimeter.

8. The method of claim 5, wherein the stand-off comprises a plurality of posts spaced apart along the back side of the airbag chute and surrounding the substrate opening.

9. The method of claim 5, wherein the stand-off is located along the back side of the airbag chute between first and second protrusions of the seal.

10. A vehicle interior panel, comprising:
  a substrate having an airbag deployment opening formed therein;
  an airbag chute attached to the substrate, the airbag chute having a perimeter surrounding the airbag deployment opening in the substrate and being formed from a first material;
  a foam layer overlying the substrate and the airbag chute; and
  a seal interposed between a back side of the airbag chute and the substrate, the seal being formed from a second material having greater flexibility than the first material,
  wherein the seal circumscribes the airbag deployment opening and defines a first interface with the airbag chute and a second interface with the substrate, the first interface comprising a chemical bond between the first and second materials without an interposed adhesive material, and
  wherein the foam layer has a boundary defined in part by the first and second interfaces such that the foam layer surrounds and extends over the airbag deployment opening but not into or through the airbag deployment opening,
  wherein the airbag chute includes a stand-off formed from the first material that contacts the substrate to limit the amount of compression of the seal and to define a distance between a back side of the airbag chute and the substrate in the vehicle interior panel, and
  wherein the stand-off is located between the seal and said perimeter.

11. The vehicle interior panel of claim 10, wherein the seal extends away from the back side of the airbag chute to a distal end that is located within and spaced from said perimeter.

12. The vehicle interior panel of claim 11, wherein a channel is defined between the seal and the back side of the airbag chute with the foam layer extending into the channel.

13. The vehicle interior panel of claim 10, wherein the seal comprises a first protrusion extending away from the back side of the airbag chute and a second protrusion that circumscribes the first protrusion.

14. A method of making a vehicle interior panel, the method comprising the steps of:
  (a) assembling an airbag chute to a vehicle interior panel substrate to form a substrate assembly with a perimeter of the airbag chute surrounding an opening in the substrate, the airbag chute being formed from a first material;
  (b) molding a foam layer onto the substrate assembly to form the vehicle interior panel, wherein a seal is affixed to the airbag chute before step (a) and configured to circumscribe the substrate opening to prevent the foam layer from extending into the opening during step (b), the seal being formed from a second material having greater flexibility than the first material; and
  (c) providing a stand-off extending between the airbag chute and the substrate to limit the amount of compression of the seal during step (a) and to define a distance between a back side of the airbag chute and the substrate in the substrate assembly,
  wherein the stand-off is located between the seal and said perimeter.

15. The method of claim 14, wherein the seal is overmolded onto the airbag chute before step (a).

16. The method of claim 14, wherein the seal comprises a protrusion that circumscribes the opening in the substrate assembly, the protrusion extending away from the back side of the airbag chute to a distal end that is located within and spaced from said perimeter.

17. The method of claim 16, wherein the protrusion extends away from the back side of the airbag chute and toward said perimeter to define a channel between the protrusion and the back side of the airbag chute.

18. The method of claim 16, wherein said protrusion is a first protrusion and the seal comprises a second protrusion that circumscribes the first protrusion, the second protrusion extending away from the back side of the airbag chute to a distal end that is located between said perimeter and the distal end of the first protrusion.

19. The method of claim 14, wherein step (a) includes biasing the seal against the substrate.

* * * * *